United States Patent Office 2,820,781
Patented Jan. 21, 1958

2,820,781

PROCESS FOR PRODUCING AMIDES

Calvin L. Stevens, Paris, France, assignor to Parke, Davis & Company, Detroit, Mich., a corporation of Michigan No Drawing. Application April 10, 1956
Serial No. 577,192

9 Claims. (Cl. 260—112)

This invention relates to a method of preparing organic amine compounds, particularly substituted amides and peptides, i. e., compounds having peptide linkages.

At the present time there are various known methods of synthesizing substituted amide compounds and peptides. However, these known methods are limited in their application for various reasons. In some cases, the chemical agents required are difficult to obtain and are, therefore, uneconomical even for limited experimental use. In other cases, the final products are ordinarily obtained in a crude state requiring tedious and costly purification measures; previously, this result has been avoided to some extent by operating at low temperature so as to minimize racemization and decomposition but even this precaution has not in general provided acceptable results as regards purity of the final product.

Therefore, it is an object of the invention to provide a method of producing substituted amides and peptide compounds which avoids the use of expensive chemical agents.

It is also an object of the invention to provide a convenient method of producing substituted amides and peptide compounds of high purity.

It is a further object to provide a means of producing substituted amides and peptides without causing undesirable racemization or decomposition.

The above objects and further objects which will be apparent in the following specification are fulfilled in accordance with the invention by reacting a ketene imine having the formula,

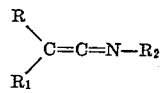

with a carboxylic acid having the formula, $R_3$—OH to obtain an imide compound having the formula,

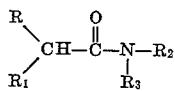

and reacting the imide compound with an amine compound having an amino group capable of being acylated; where R, $R_1$ and $R_2$ represent lower alkyl, aryl and aralkyl groups and $R_3$ represents a carboxylic acid acyl group.

In carrying out the process the ketene imine and carboxylic acid are reacted in substantially equivalent proportion in a suitable aqueous or anhydrous inert organic solvent. While the reaction can be carried out at room temperature it is preferable to heat the reaction mixture in order to minimize the time required for complete reaction. In most cases this is best accomplished by maintaining the reaction mixture at reflux temperature. As indicated above, various ketene imines can be employed as starting materials. In general, ketene imines having lower alkyl, aryl and aralkyl substituents such as methyl, ethyl, n-propyl, isopropyl, n-butyl, sec. butyl, tert. butyl, phenyl, benzyl, tolyl and like groups, are suitable. The use of aryl and aralkyl substituted ketene imines leads in most cases to a readily isolable, crystalline product and is therefore preferred. Any of a wide variety of carboxylic acids may be employed for the reaction, the main requirement being that the carboxylic acid contain the particular acyl group which is intended for ultimate attachment to the amino group in the final amide or peptide product and yet not contain a free, primary amino group. As an illustration of representative acids there may be mentioned substituted and unsubstituted fatty acids such as acetic acid, mono-, di- and tri-chloroacetic acids, propionic acid, butyric acid and the like, and N-acyl, N-phthalyl and N-carbobenzoxy derivatives of amino acids such as alanine, glycine, serine, β-phenylserine, valine, norvaline, leucine, norleucine, isoleucine, isovaline, phenylalanine, tryosine, cysteine, methionine, arginine, histidine, threonine, lysine, ornithine, asparagine, thyroxine, trypophane, proline, hydroxyproline and the like. Representative examples of these N-substituted amino acids are phthalimidoacetic acid, N-carbobenzoxyglycine, β-phthalimidopropionic acid, N-phthalylphenylalanine, N,N'-dicarbobenzoxylysine, and the like. As indicated, the reaction is carried out in the presence of an aqueous or anhydrous organic solvent. Some suitable solvents for this purpose are lower aliphatic alcohols such as methanol, ethanol, n-propanol, iso-propanol, and the like; ethers such as diethyl ether, monomethylglycol ether, dioxane, tetrahydrofuran and the like; hydrocarbons such as benzene, toluene, petroleum ether and the like; halogenated aliphatic hydrocarbons such as methylene dichloride, ethylene dichloride, chloroform and the like; and tertiary amides such as dimethylformamide. Although it is preferable to employ equivalent proportions of the ketene imine and carboxylic acid starting materials, moderate excesses of either are permissible. It is a desirable feature of the invention that the yields of the intermediate imide product are quite favorable, ordinarily ranging from 85 to 95 percent. The intermediate can be isolated, if desired, or it can be employed in situ for conversion to the final product, thereby avoiding further work-up and eliminating the need for additional solvents.

The final product is obtained by reacting equivalent quantities of the amine and the intermediate imide compound in the presence of an aqueous or anhydrous organic solvent for at least one of the reactants. The reaction can be effected over a wide range of temperature. In general, temperatures in the range of 20 to 140° C. are suitable; for best results, the reaction is carried out at the reflux temperature of the reaction mixture. Solvents of the above-mentioned type are suitable and if desired, the reaction mixture resulting from the previous step can be employed. It is unnecessary to have both reactants in complete solution although it is usually preferred. A wide variety of amine compounds can be employed, these being in general primary and secondary amines and amino acids having not more than one free or unblocked amino group. Some of the amine compounds which are suitable are the primary aliphatic amines such as methylamine, ethylamine, propylamine, butylamine, hexylamine, and the like; the secondary aliphatic amines such as dimethylamine, dibutylamine and the like; substituted aliphatic amines such as chlorethylamine, phenethylamine, benzylamine, serinol, β-phenylserinol, β-p-nitrophenylserinol and the like; aromatic amines such as aniline, naphthylamine and the like; substituted aromatic amines such as m-toluidine, p-benzylaniline, secondary mixed aliphatic-aromatic amines such as N-alkylaniline and the like; cyclic amines such as piperidine, morpholine and the like; heterocyclic amines such as aminopyrimidine and the like; and diamines such as ethylenediamine, butylenediamine and the like. Of particular use for the production of peptides and polypeptides are the amino acids, basic salts, esters and amides thereof; acid salts may also be employed and the reaction carried out in the presence of a basic medium thereby causing release of the free amino acid in situ. The amino acids which can be employed, in free acid, basic salt, acid salt, ester or amide form are illustrated by the following: alanine, glycine, serine, β-phenylserine, β-p-nitrophenylserine, valine, norvaline, leucine, norleucine, isoleucine, isovaline, phenylalanine, tyrosine, cysteine, aspartic acid, asparagine, methionine, arginine, histidine, tryptophane, proline, glutamic acid, hydroxyglutamic acid, hydroxyproline and the like. The process is particularly suitable for use with amino acids having a single free amino group; amino acids having more than one free amino group can be employed but in those cases where it is desired to acylate only one of the amino groups the remaining amino group or groups should be protected by a readily removable covering group such as an N-carbobenzoxy or N-phthalyl group. It will be apparent to those skilled in the art that the process of the invention is applicable to the production of long chain polypeptides starting from relatively simple amino acids or peptide materials and building step-wise with particular aminoacid adducts until the desired polypeptide product is obtained.

The invention is illustrated by the following examples.

*Example 1*

A mixture of 2 g. of diphenylketene-p-tolylimine and 1.46 g. of phthalimidoacetic acid in 35 ml. of benzene is heated at reflux temperature for two hours. The reaction mixture is concentrated by distillation in vacuo and the residual product is recrystallized from a mixture of hexane and acetone; M. P. 179–180° C. The product, N-p-tolyl-N-phthalimidoacetyl-diphenylacetimide, has the formula,

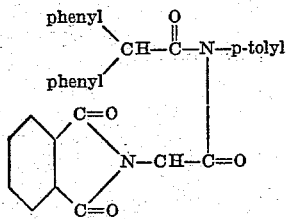

(a) One gram of N-(p-tolyl)-N-phthalimidoacetyldiphenylacetimide and 0.21 g. of ethyl glycinate are dissolved in 20 ml. of benzene and the solution heated at reflux temperature for three and one-half hours. The reaction mixture is filtered while hot and the filter cake containing a major portion of the product is recovered. An additional quantity of the product is obtained by concentrating the filtrate to dryness, extracting the residue with hot water and recovering the solid material which separates on cooling; total yield, 0.35 g., M. P. 187–188° C. The product is N-phthalylglycylglycine ethyl ester.

N-phthalylglycyl-p-aminobenzoate ethyl ester (yield, 0.52 g.; M. P. 207–208° C.) can be obtained by the same procedure starting with 1 g. of N-p-tolyl-N-phthalimidoacetyldiphenylacetimide and 0.34 g. ethyl p-aminobenzoate in 20 ml. of benzene and heating at reflux temperature for forty-five hours.

(b) A mixture of 1 gram of N-(p-tolyl)-N-phthalimidoacetyldiphenylacetimide, 0.4 g. of glycylglycine ethyl ester hydrochloride and 0.34 g. of triethylamine in 15 ml. of benzene is heated at reflux temperature for six hours, cooled, 15 ml. of benzene added and the resulting product, N-phthalylglycylglycylglycine ethyl ester, removed and recrystallized from water; M. P. 226–227° C.

*Example 2*

A mixture of 1 g. of diphenylketene-p-tolylimine and 1.05 g. of N-phthalyl-L-phenylalanine in 15 ml. of benzene is heated at reflux temperature for nine and one-half hours; 0.51 g. of ethyl L-leucinate is added and the mixture is further heated at reflux temperature for twenty-seven and one-half hours and then concentrated by distillation in vacuo to a small volume. The residual product, N-phthalyl-L-phenyl-alanyl-L-leucine ethyl ester, is purified by recrystallization from hexane and alcohol-water; M. P. 106–108° C. There is no loss of optical activity in the preparation of the product.

*Example 3*

A mixture of 1 g. of N-p-tolyl-N-phthalimidoacetyl-diphenylacetimide and 0.34 g. of ethyl L-leucinate in 15 ml. of benzene is heated at reflux temperature for two hours, cooled and the benzene removed by distillation in vacuo. The residual product, N-phthalylglycyl-L-leucine ethyl ester, is converted to the corresponding free dipeptide by acid hydrolysis, preferably by taking up in a solution of 5 ml. of concentrated hydrochloric acid, 5 ml. of water and 10 ml. of acetone and heating the resulting mixture for two hours at reflux temperature. The solids are removed by filtration, the filtrate extracted with 20 ml. of 10% sodium bicarbonate, the extracts are filtered and the filtrate acidified with dilute hydrochloric acid until acid to Congo red paper. The crystalline product, glycyl-L-leucine, is isolated by filtration and recrystallized from dilute aqueous ethanol; M. P. 103–106° C.

*Example 4*

A mixture of 8 g. of diphenylketene-p-tolylimine and 5.9 g. of N-carbobenzoxyglycine in 60 ml. of benzene is heated at reflux temperature for five and one-half hours, cooled, filtered and the filter cake dried. The product is N - (N′-carbobenzoxyglycyl) -N-p-tolyldiphenylacetimide; M. P. 165–166° C., 12.1 g. yield.

(a) A mixture of 2 g. of the diphenylacetimide product, 0.75 g. of DL-threonine ethyl ester hydrochloride, 0.65 g. of triethylamine and 16 ml. of methylene chloride is stirred until solution is complete and is then heated at reflux temperature for six hours. The reaction mixture is concentrated to dryness by evaporation, the residue is taken up in 25 ml. of acetone, 8 ml. of normal sodium hydroxide solution is added and the resulting mixture is stirred for one hour at room temperature. The mixture is concentrated to a small volume (5 ml.) by evaporation, 25 ml. of water is added and the mixture is filtered. The filtrate is acidified and the crystalline product, N-carbobenzoxyglycyl-DL-threonine, is isolated by filtration and recrystallized from aqueous ethanol; M. P. 133–135° C.

(b) A mixture of 1 g. of the above diphenylacetimide product and 0.44 g. of L-tryptophane methyl ester in 20 ml. of 80% methanol is heated at reflux temperature for four hours and the reaction mixture filtered while hot. The filtrate is allowed to cool and the crystalline product, N-phthalylglycyl-L-tryptophane methyl ester, recovered and dried.

*Example 5*

A mixture of 1.27 g. of ethyl n-butylketene-n-butylimine and 1.46 g. of phthalimidoacetic acid in 35 ml. of benzene is heated at reflux temperature for two hours. The benzene is removed from the reaction mixture by distillation and the residual product, N-(n-butyl)-N-phthalimidoacetyl-α-ethylcaproimide, is purified by recrystallization from hexane containing a trace of benzene.

A mixture of 1.1 g. of the caproimide product and 0.36 g. of ethyl glycinate in 16 ml. of methylene chloride is heated for six hours at reflux temperature. The reaction mixture is taken to dryness by evaporation, the residual product is extracted with hot water, the extracts cooled and the resulting crystalline product, N-phthalylglycylglycine ethyl ester, is collected and dried; M. P. 187–188° C.

Example 6

A mixture of 2 g. of diphenylketene-p-tolylimine and 1.56 g. of β-phthalimidopropionic acid in 20 ml. of benzene is heated for eight hours at reflux temperature. The reaction mixture is concentrated to dryness by evaporation and the residual product, N-(p-tolyl)-N-phthalimidopropionyldiphenylacetimide is recrystallized from a mixture of ethyl acetate and petroleum ether or benzene and petroleum ether; M. P. 120–121° C.

A mixture of 0.75 g. of the diphenylacetimide product, 0.21 g. of glycine ethyl ester hydrochloride and 0.28 g. of triethylamine in 10 ml. of methylene chloride is stirred until solution is complete and then heated at reflux temperature for six hours. The solvent is removed from the reaction mixture by evaporation and the residual product, N- phthalyl-β-alanylglycine ethyl ester, is recrystallized from hot water; M. P. 136–141° C.

Example 7

A mixture of 0.36 g. of ethyl-n-butylketene-n-butylimine and 0.83 g. of dicarbobenzoxyglycine in 25 ml. of methylene chloride is heated at reflux temperature for one and one-half hours, the solvent is removed by distillation in vacuo and the residue taken up in 10 ml. of cold methanol. The resulting solution is added to a solution of 0.53 g. of methionine methyl ester in 10 ml. of methanol and the mixture heated at reflux temperature for three hours. The reaction mixture is concentrated to dryness and the residual product, dicarbobenzoxyglycylmethionine methyl ester, recrystallized from a mixture of benzene and petroleum ether.

Example 8

A mixture of 2.85 g. of diphenylketene-p-tolylimine and 1.3 g. of dichloroacetic acid in 35 ml. of benzene is heated at reflux temperature for one and one-half hours and the reaction mixture taken to dryness by distillation in vacuo. The residual product, N-dichloroacetyl-N-(p-tolyl)-diphenylacetimide, is taken up in 25 ml. of cold methanol and added to a solution of 2.1 g. of D-threo-1-nitrophenyl-2-aminopropane-1,3-diol in 25 ml. of 80% methanol. The mixture is heated at reflux temperature for one hour, cooled and concentrated to approximately one-half volume by distillation. The residual solution is cooled and the crystalline product, D-threo-1-p-nitrophenyl-2-dichloroacetamidopropane-1,3-diol, recovered by filtration and dried; M. P. 149–150° C.

Example 9

1.27 g. of ethyl n-butylketene-n-butylimine is dissolved in 43 ml. of ethanol and the volume of the resulting solution is adjusted to 50 ml. with water; 1.46 g. of phthalimidoacetic acid is dissolved in 50 ml. of 85% ethanol. The two solutions are mixed and allowed to stand for sixteen hours at room temperature (20–22° C.). The solvent is removed by vacuum distillation, and the residual product, N-(n-butyl)-N-phthalimidoacetyl-α-ethylcaproimide, is isolated and recrystallized from hexane containing a trace of benzene.

A mixture of 1.1 g. of the caproimide product is dissolved in 45 ml. of dioxane and the volume of the solution adjusted to 50 ml. with water. 0.36 g. of ethyl glycinate is then added to the solution, and the mixture is allowed to stand at room temperature for twenty-four hours. The reaction mixture is taken to dryness by vacuum distillation, the residual product is extracted with hot water, the extracts cooled and the resulting crystalline product, N-phthalylglycylglycine ethyl ester, is collected and dried; M. P. 187–188° C.

The ketene imine starting materials for the process of the invention can be prepared by the methods set forth in the Journal of the American Chemical Society, volume 75, page 657 et. seq. and volume 76, page 4398 et seq.

I claim:

1. The method of producing amide compounds which comprises reacting a ketene imine having the formula,

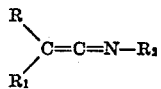

with a carboxylic acid having the formula,

to obtain an imide compound having the formula,

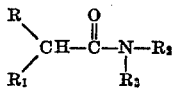

and reacting said imide compound with an amine compound having an amino group capable of being acylated; where R, $R_1$ and $R_2$ represent members of the group consisting of lower alkyl, aryl and aralkyl groups and $R_3$ represents a monocarboxylic acid acyl group.

2. The method of producing amide compound which comprises contacting a ketene imine having the formula,

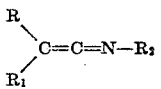

with a substantially equivalent quantity of a carboxylic acid having the formula,

in the presence of an inert organic solvent to obtain an imide compound having the formula,

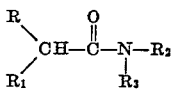

and contacting said imide compound with an equivalent quantity of an amine compound having an amino group capable of being acylated, in the presence of an organic solvent for at least one of said imide and amine compounds; where R, $R_1$ and $R_2$ represent members of the group consisting of lower alkyl, aryl and aralkyl groups and $R_3$ represents a monocarboxylic acid acyl group.

3. The method of producing amide compounds which comprises contacting diphenylketene-p-tolylimine with a substantially equivalent quantity of a carboxylic acid in the presence of an inert organic solvent to obtain an N-acyl-N-p-tolyl-diphenylacetimide and contacting said acetimide with an equivalent quantity of an amine compound having an amino group capable of being acylated, in the presence of an organic solvent for at least one of said acetimide and amine compounds.

4. The method of producing amide compounds which comprises contacting diphenylketene-p-tolylimine with a substantially equivalent quantity of a carboxylic acid in the presence of an inert organic solvent thereby obtaining an N-acyl-N-p-tolyldiphenylacetimide, and contacting said acetimide with an equivalent quantity of an amino acid compound having a single free amino group capable of being acylated, in the presence of an organic solvent for at least one of said acetimide and amino acid compounds.

5. Process in accordance with claim 4 wherein said amino acid compound is a lower alkyl ester of a monocarboxylic mono-amino acid.

6. Process in accordance with claim 4 wherein said amino acid compound is a lower alkyl ester of a monocarboxylic mono-amino acid.

7. The method according to claim 4 in which the carboxylic acid is phthalamidoacetic acid, and said amino acid compound is ethyl glycinate.

8. The method of producing amide compounds which comprises contacting ethyl n-butylketene-n-butylimine with a substantially equivalent quantity of a carboxylic acid in the presence of an inert organic solvent to obtain an N-acyl-N-(n-butyl)-α-ethylcaproimide and contacting said caproimide with an equivalent quantity of an amine compound having an amino group capable of being acylated in the presence of an organic solvent for at least one of said caproimide and amine compounds.

9. The method of producing amide compounds which comprises contacting ethyl n-butylketene-n-butylimine with a substantially equivalent quantity of a carboxylic acid in the presence of an inert organic solvent thereby obtaining an N-acyl-N-(n-butyl)-α-ethylcaproimide and contacting said caproimide with an equivalent quantity of an amino acid compound having a single free amino group capable of being acylated, in the presence of an organic solvent for at least one of said caproimide and amino acid compounds.

References Cited in the file of this patent

Staudinger et al.: Ber. Deut. Chem., vol. 53, pgs. 72–6 (1920).

Staudinger et al.: Helv. Chim. Acta, vol. 4, pg. 887 (1921).

Wieland: Angew. Chem., vol. 63, pgs. 7–14 (1951).